(12) United States Patent
Bauerle et al.

(10) Patent No.: US 8,473,114 B2
(45) Date of Patent: Jun. 25, 2013

(54) METHOD OF MONITORING VEHICLE BATTERIES

(75) Inventors: Paul A. Bauerle, Fenton, MI (US); Marco J. Gatti, Southgate, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 604 days.

(21) Appl. No.: 12/687,921

(22) Filed: Jan. 15, 2010

(65) Prior Publication Data

US 2011/0178654 A1 Jul. 21, 2011

(51) Int. Cl.
*G06F 7/00* (2006.01)
(52) U.S. Cl.
USPC ............................... 701/2; 701/31.4; 320/132
(58) Field of Classification Search
USPC .................. 701/2, 29.1, 31.4; 702/63–65, 57, 702/79, 182, 183; 320/132, 104, 161, 162, 320/164; 340/63.11–63.16, 661; 324/426, 324/430, 431, 434
See application file for complete search history.

(56) References Cited

U.S. PATENT DOCUMENTS

| | | | | |
|---|---|---|---|---|
| 5,959,435 A * | 9/1999 | Ikegami | ........................ | 320/132 |
| 6,452,361 B2 * | 9/2002 | Dougherty et al. | ........... | 320/104 |
| 6,456,036 B1 * | 9/2002 | Thandiwe | ..................... | 320/106 |
| 7,606,643 B2 * | 10/2009 | Hunt et al. | ...................... | 701/36 |
| 7,760,108 B2 * | 7/2010 | McCall et al. | ............. | 340/12.15 |
| 7,983,812 B2 * | 7/2011 | Potter | ............................. | 701/36 |
| 8,060,322 B2 * | 11/2011 | Seo et al. | ......................... | 702/63 |
| 2002/0008495 A1 * | 1/2002 | Dougherty et al. | ........... | 320/104 |
| 2005/0125138 A1 * | 6/2005 | Hosoya et al. | ................ | 701/114 |
| 2009/0021385 A1 * | 1/2009 | Kelty et al. | .................... | 340/660 |
| 2009/0043476 A1 * | 2/2009 | Saito et al. | .................... | 701/102 |
| 2010/0121588 A1 * | 5/2010 | Elder et al. | ..................... | 702/63 |
| 2010/0301810 A1 * | 12/2010 | Biondo et al. | ................ | 320/155 |
| 2011/0270487 A1 * | 11/2011 | Dickinson et al. | .............. | 701/33 |

\* cited by examiner

*Primary Examiner* — Marthe Marc-Coleman
(74) *Attorney, Agent, or Firm* — Quinn Law Group, PLLC

(57) ABSTRACT

A method for monitoring a vehicle battery includes running a timer while the vehicle and a controller are in off states. The method wakes the control module after a first time increment measured by the timer, and sets a second time increment. If needed, the method samples a first state of charge of the battery, and determines whether the battery requires charging prior to the second time increment based upon the sampled first state of charge. Determining whether the battery requires charging may include comparing the first state of charge to a threshold state of charge, or comparing to a second state of charge measured after the second time increment. A diagnostic message may be sent from the vehicle via a communications path, and, if the battery requires charging, an alert message sent to a receiving point accessible to vehicle operator.

19 Claims, 2 Drawing Sheets

METHOD OF MONITORING VEHICLE BATTERIES

TECHNICAL FIELD

This disclosure relates to monitoring batteries of a vehicle while the vehicle is not operating.

BACKGROUND OF THE INVENTION

Motorized vehicles include a powertrain operable to propel the vehicle and power the onboard vehicle electronics. The powertrain, or drivetrain, generally includes an engine that powers the final drive system through a multi-speed power transmission. Many vehicles are powered by a reciprocating piston type internal combustion engine (ICE).

Hybrid vehicles utilize multiple alternative power sources to propel the vehicle, minimizing reliance on the engine for power. A hybrid electric vehicle (HEV), for example, incorporates both electric energy and chemical energy, and converts the same into mechanical power to propel the vehicle and power the vehicle systems. The HEV generally employs one or more electric machines (motor/generators) that operate individually or in concert with the internal combustion engine to propel the vehicle.

The electric machines convert kinetic energy into electric energy which may be stored in an energy storage device. The electric energy from the energy storage device may then be converted back into kinetic energy for propulsion of the vehicle. Electric vehicles also include one or more electric machines and energy storage devices used to propel the vehicle. Conventional vehicles may include an electric machine to convert kinetic energy of the engine into electric energy which is stored in a starting, lighting, and ignition (SLI) battery.

SUMMARY

A method for monitoring a battery, or batteries, of a vehicle having a control module and a timer is provided. The method includes running the timer while the vehicle is in an off state, and while the control module is also in an off state. The method wakes up the control module after lapse or passage of a first time increment measured by the timer, and sets a second time increment. If needed, the method samples a first state of charge of the battery. The method determines whether the battery requires charging prior to the expiration of the second time increment based upon the sampled first state of charge. Determining whether the battery requires charging may include comparing the first state of charge to a threshold state of charge.

The method may further include waking up the control module following lapse or passage of the second time increment measured by the timer and sampling a second state of charge of the battery. Determining whether the battery requires charging may include comparing the second state of charge of the battery to the first state of charge.

The vehicle may be configured for selective communication with a communications path, and the method may further include sending a diagnostic message via the communications path. The diagnostic message includes whether the battery requires charging. If the battery requires charging, an alert message may be sent to a receiving point accessible to an operator of the vehicle.

The above features and advantages and other features and advantages of the present invention are readily apparent from the following detailed description of the best modes and other embodiments for carrying out the invention when taken in connection with the accompanying drawings.

DESCRIPTION OF PREFERRED EMBODIMENTS

Figure 1:
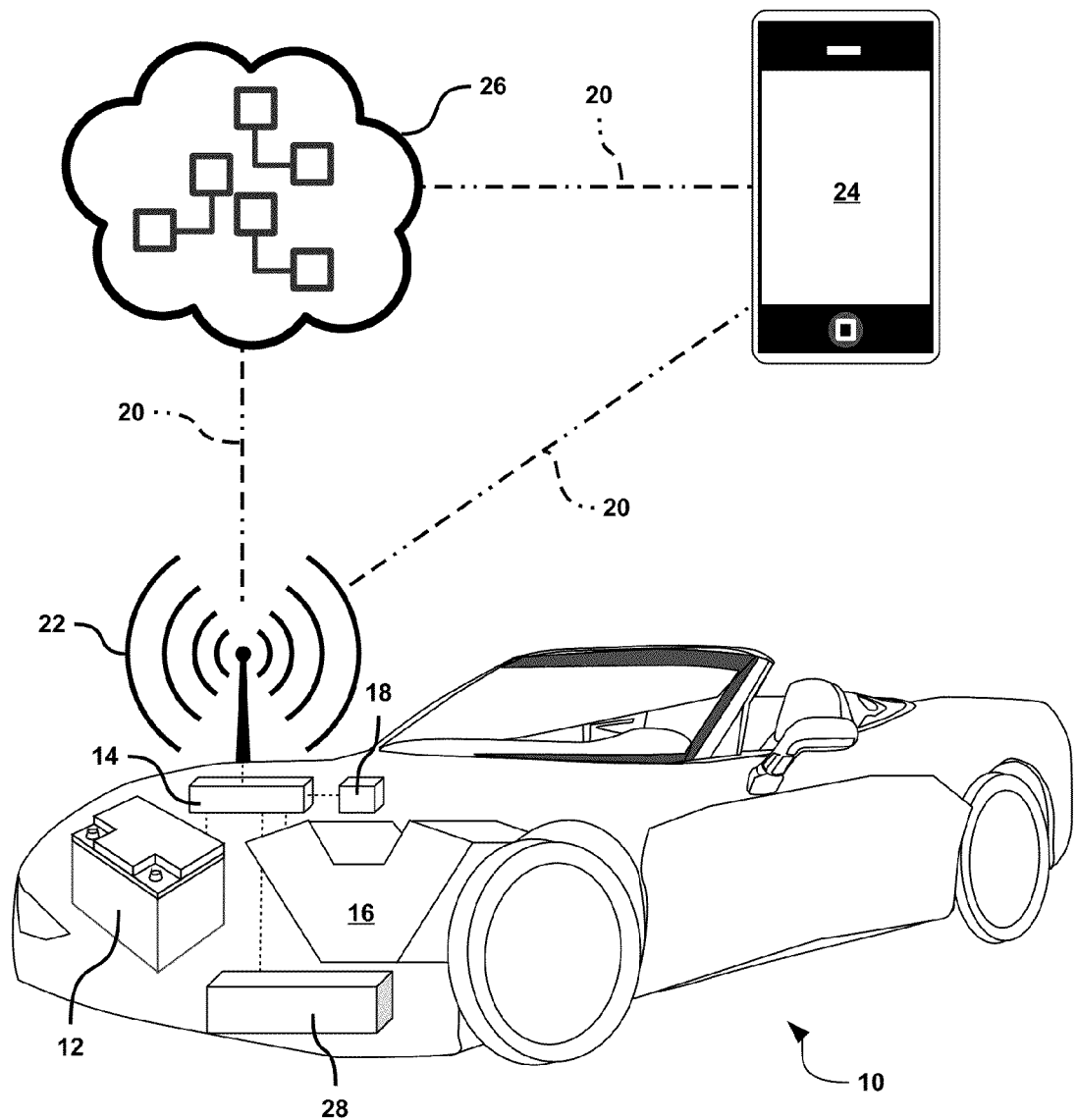
FIG. 1 is a schematic depiction of a vehicle and associated communications diagram.

Referring to the drawings, wherein like reference numbers correspond to like or similar components throughout the several figures, there is shown in FIG. 1 a schematic depiction of a vehicle 10 usable with the claimed invention. The vehicle 10 includes a battery 12, which may be a starting, lighting, and ignition (SLI) battery, a hybrid battery, a battery pack, or another electric energy storage device. The vehicle 10 may be a conventional vehicle, a hybrid vehicle, or an electric vehicle. Especially with regard to hybrid or electric vehicle configurations, the vehicle 10 may include multiple batteries 12, which may provide power to a powertrain (not separately indicated in FIG. 1) to propel the vehicle.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The vehicle 10 further includes a control module 14 in communication with the battery 12 and other components of the vehicle 10. The vehicle 10 may include an engine 16 as a prime mover and traction device. Furthermore, one or more electric machines (not shown)—such as electric fraction motors or motor/generators—may be included as additional or substitute prime movers for the powertrain of the vehicle 10. The engine 16 may be configured to recharge the battery 12 by supplying mechanical energy which is converted to electrical energy via one or more of the electric machines. Alternatively, if the vehicle 10 is purely an electric vehicle, recharging the battery 12 may occur by plugging in the vehicle 10 to a power source.

The control module 14 may have a distributed controller architecture, may be a microprocessor-based electronic control unit (ECU), and may be incorporated into the engine control module (ECM) for the vehicle 10. The control module 14 includes a storage medium with a suitable amount of programmable memory, and is capable of storing and executing one or more algorithms to effect control over the components of the vehicle 10. The control module 14 may include multiple control modules or components in communication with each other and the vehicle 10. The control module 14 may be further configured to execute algorithms, methods, or tasks other than those described herein.

While the vehicle 10 is in operation or operational, the control module 14 is usually in an "on state," and while the vehicle 10 is not in operation or operational, the control module 14 is usually in an "off state." These on and off states of the control module 14 may also referred to as waking and sleeping states, respectively.

Operation of the vehicle 10 generally occurs while the vehicle is either occupied or is ready to be occupied, such as while the ignition is on and the engine 16 is running or idling.

Furthermore, in electric or hybrid electric vehicles, operation may occur with the ignition on and the engine 16 off. The on state and off state of the vehicle 10 may also be expressed in terms of the ability of the vehicle to move or by driven. If the vehicle 10 cannot be driven—such as when the vehicle 10 is in park with the security system armed and without the operator—the vehicle 10 is in the off state. Conversely—such as when the vehicle 10 is parked and idling—the vehicle 10 is ready to drive and capable of driving, and is in the on state.

Some configurations of the vehicle 10 may not include a traditional (key-based) ignition, and may be operational whenever the operator (driver) of the vehicle 10 is within proximity of the vehicle 10. For example, the vehicle 10 may be operational whenever a key fob or remote security device (not shown) is inside of the vehicle or whenever a start button (not shown) is pushed.

The vehicle 10 includes a timer 18 in communication with the control module 14. The timer 18 may be included within the control module 14 architecture or configured as a separate component. While the vehicle 10 is not operating and the control module 14 is otherwise asleep, the timer 18 is configured to run, lapse, count, or increment. Therefore, the timer 18 is configured to run even while both the vehicle 10 and control module 14 are off, providing a mechanism to determine the length of time during which the vehicle 10 and control module 14 are off or asleep.

The timer 18 is further configured to periodically wake up the control module 14. After passage of a time increment, the timer 18 wakes the control module 14 to allow or command the control module 14 to execute algorithms or processes. The timer 18 may be configured to wake up the control module 14 based upon a predefined, and preset time increment, or may be configured to change the time increment between waking the control module 14.

For example, and without limitation, the timer 18 may be configured to wake up the control module 14 whenever the vehicle 10 is parked and non-operational for a period of 7 days (one week). Alternatively, the timer 18 may be configured to incorporate one or more conditions of the vehicle 10 and calculate a variable time increment before, and between, waking up the control module 14. As another example, the timer 18 may be in communication with a thermometer (not shown) and adjust the time increment based upon the ambient temperature at the location in which the vehicle 10 is parked. If the vehicle 10 is a plug-in hybrid or plug-in electric vehicle, the timer 18 may incorporate whether or not the vehicle 10 is plugged in when calculating and setting the time increment.

Following lapse of an initial or first time increment, the timer 18 wakes the control module 14 and sets a subsequent, next, or second time increment. After lapse of the next time increment, the timer 18 will again wake the control module 14.

After waking up, the control module 14 is configured to sample, test, or determine a state of charge (SOC) of the battery 12. State of charge is the equivalent of a fuel gauge for the battery 12, representing stored electrical energy that may be consumed by the vehicle 10. The units of state of charge may be expressed as percentage points (0%=empty; 100%=full). Charging refers, generally, to increasing the state of charge of the battery 12; and, conversely, discharging generally refers to decreasing the state of charge of the battery 12.

The state of charge of many batteries decreases over time. This may be referred to as self-discharge. The speed or rate of self-discharge is dependent on the type of battery 12. Furthermore, because self-discharge is a chemical reaction, the temperature of the battery 12 may alter the rate of self-discharge.

If the vehicle 10 is left parked and non-operational for an extended period of time, the battery 12 may self-discharge and lower the state of charge to below a threshold level. At or below the threshold level—which will vary based upon the type of battery 12 and the vehicle 10—the battery 12 may not have sufficient stored energy to propel the vehicle 10 or to start the engine 16. Therefore, it may be advantageous for the operator of the vehicle 10 to start the engine 16 and recharge the battery 12 before the state of charge decreases to below the threshold level.

The control module 14 is further configured to determine whether or not the conditions of the vehicle 10 require sampling the state of charge of the battery 12. If, for example, the initial time increment measured by the timer is 2 days, and the state of charge of the battery 12 was 100% when the vehicle was initially parked and placed into an off state, the control module 14 may determine that it is unnecessary to sample the state of charge of the battery 12 after such a short passage of time. Therefore, the control module 14 may log or store that it did not sample the state of charge following the first increment and use that data to determine whether or not sampling is required after waking up following passage of the second increment of time measured by the timer 18.

When the control module 14 does determine that the state of charge of the battery 12 should be sampled, the control module 14 samples and logs a first state of charge of the battery 12. In order to determine the state of charge, the control module 14 may test the current and voltage of the battery 12. With the current and voltage, the control module 14 may refer to a lookup table to determine the state of charge of the battery 12. Additional conditions, such as the ambient temperature of the battery 12 or vehicle 10 at the sampling time may be incorporated into calculation, or estimation, of the state of charge.

Once the control module 14 has determined a first state of charge of the battery 12, the control module 14 then determines whether the battery 12 requires charging prior to the expiration of the next time increment based upon the first state of charge of the battery 12. For example, and without limitation, if the first state of charge of the battery is 95% and the next time increment is 2 days, it is unlikely that the state of charge will decrease to below the threshold level before passage of the next time increment.

Alternatively, the control module 14 may compare the first state of charge to the threshold state of charge to determine whether the battery 12 requires charging. In such a configuration, the control module 14 will consider any first state of charge which is less than the threshold state that requires charging of the battery 12, either immediately or prior to expiration of the next time increment.

The vehicle 10 and control module 14 may also be configured for selective communication with a communications path 20, such as via an antenna 22. Therefore, upon determining whether the state of charge requires charging of the battery 12, the control module 14 may communicate that data to an operator of the vehicle 10.

The control module 14 may be configured to send a diagnostic message via the communications path 20. The diagnostic message may include data such as, for example, whether the battery 12 requires charging, the first state of charge of the battery 12 and the second state of charge of the battery 12. Alternatively, the control module 14 may be configured only to sample the state of charge of the battery 12 on board the vehicle 10, and the determination of whether the battery 12 requires charging may be made off board the vehicle 10.

If the battery 12 requires charging, the control module 14 may send an alert message via the communications path 20 to a receiving point 24. The alert message may be combined with, or be separate from, the diagnostic message. The receiving point 24 is a device accessible to an operator of the vehicle 10, such that the operator is made aware of the need to recharge the battery 12.

The receiving point 24 may be, for example, and without limitation: a telephone number, a cellular telephone number, an email address, an instant messaging account, a social networking account, or a similar communication interface. Therefore, once the operator receives the alert message via (for example) phone call, text message, email message, or instant message, the operator may be able to provide for starting the engine 16 of the vehicle 10 or otherwise charging the battery 12.

The communications path 20 is configured to convey the diagnostic message, the alert message, or both to the receiving point 24. The communications path 20 may pass through or include, without limitation: a wireless local area network (e.g. Wi-Fi or a hotspot), a cellular network, a Bluetooth protocol, satellite communications, or radio waves. For example, the control module 14 may be configured to directly send a text message to the operator's cellular phone (the receiving point 24). Multiple communications paths 20 may be utilized by the control module 14 as alternative and redundant delivery methods for the diagnostic message and alert message.

A network 26 may be utilized by the control module 14 to distribute, analyze, or route the diagnostic message and the alert message to the receiving point 24. For example, the antenna 22 may communicate the alert message via cellular signals to a computer in the network 26, which may then convert the alert message to an email and send the email to the operator. The network 26 may include computer processing of the diagnostic message to determine, from data collected by the control module 14, whether the state of charge of the battery 12 requires charging. Furthermore, the network 26 may store the diagnostic message for future use or for servicing the vehicle 10 and battery 12.

The communications path 20, receiving point 24, and control module 14 may be further configured to allow remote starting of the vehicle 10 in order to charge the battery 12. For example, if the operator receives an email alert message, the operator may be able to send a remote starting command via the communications path 20. The remote starting command could be sent via a link in the email, by reply to the alert message, or other communication by the operator for the receiving point 24.

The operator may be aware of the location of the vehicle 10, such that the operator can determine whether conditions allow the vehicle 10 to be remotely started without the operator gaining direct access to the vehicle 10. Alternatively, some configurations of the vehicle 10 may have sensors (not shown) capable of determining whether conditions around the vehicle 10 will allow the vehicle 10 to be remotely started without the operator gaining direct access to the vehicle 10. In such a case, the remote start command may be sent without interaction from the operator, such as through an automatic process from the network 26 or by the control module 14 itself.

The control module 14 may be configured to recognize multiple threshold state of charge values. For example, and without limitation, finding the state of charge below a first threshold value may trigger only a diagnostic message, while finding the state of charge below a second (lower) threshold value may trigger sending the alert message to the receiving point 24. Similarly, finding the state of charge below a third (even lower) threshold value may trigger an automatic remote start command, if available and allowable.

If the vehicle 10 cannot be remotely started, or if no remote start command is immediately sent from the receiving point, the control module 14 is configured to return to its off or sleeping state. By returning the control module 14 to sleep, the power usage of the battery 12 is conserved until the timer 18 measures a subsequent (third) time increment.

In series hybrid powertrains, or other vehicles relying heavily on the engine 16 to charge the battery 12, the level of fuel available to operate the engine 16 may be an important factor in the subsequent ability of the vehicle 10 to recharge the battery 12. Therefore, the control module 14 may also sample a fuel level from within a fuel tank 28. The fuel level may be utilized in determining whether the fuel tank 28 requires refueling based upon both the fuel level and the state of charge of the battery 12.

If the state of charge of the battery 12 is well below the threshold level, for example, the engine 16 may be required to run for some time in order to recharge the battery 12 and may be required to do so while also propelling the vehicle 10. However, if the fuel level of fuel tank 28 is very low, the combined requirements of propelling the vehicle 10 and recharging the battery 12 may deplete the fuel level more quickly than the operator would otherwise expect. Therefore, the alert message may also include whether the fuel tank 28 requires refueling, so that the operator is aware of the need.

Figure 2:
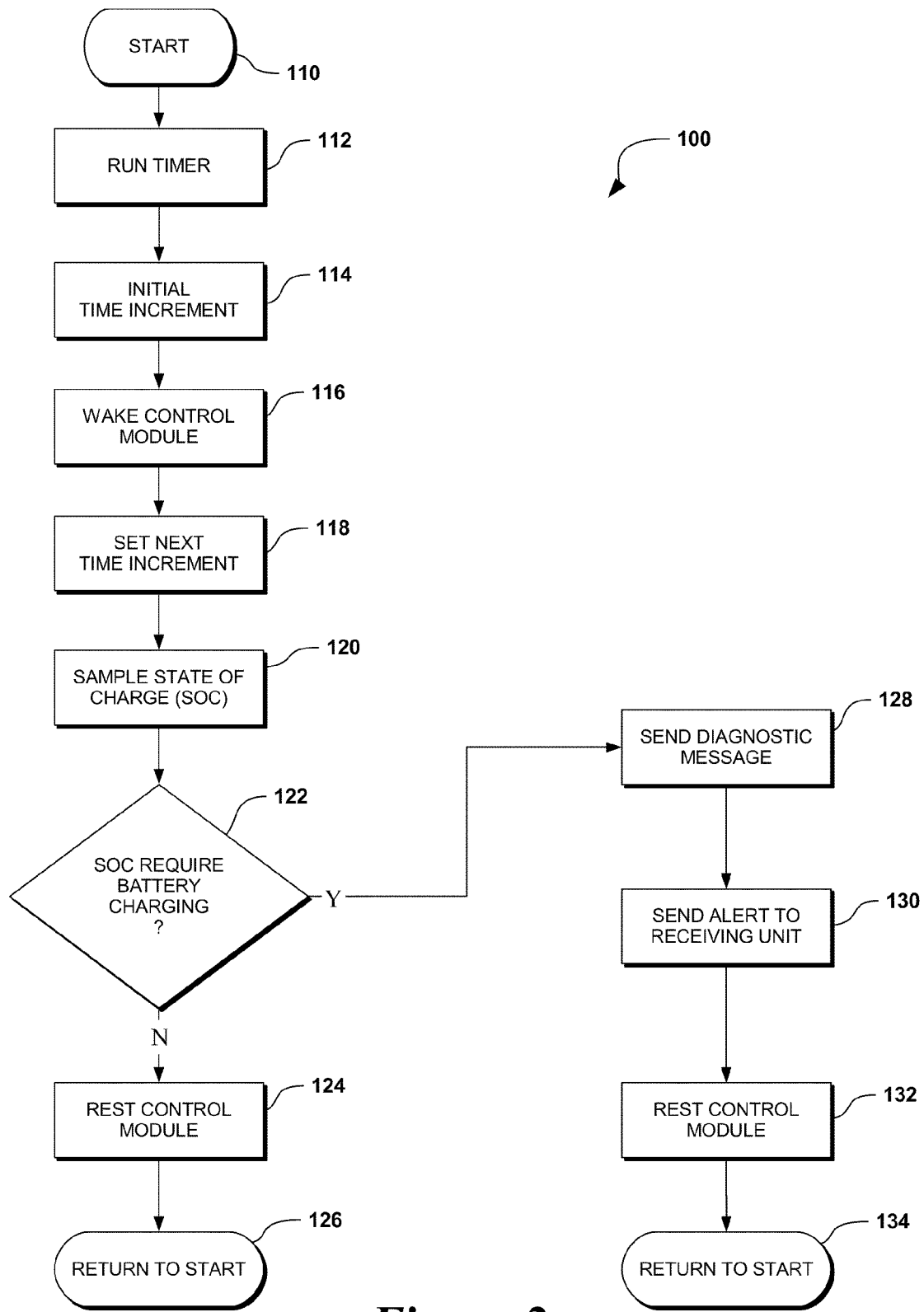
FIG. 2 is a schematic flow chart diagram of a method or algorithm for monitoring a vehicle battery.

Referring now to FIG. 2, and with continued reference to FIG. 1, there is shown an algorithm 100 usable for monitoring a battery (such as battery 12) of a vehicle (such as vehicle 10). The algorithm 100 is shown as a schematic flow chart.

The algorithm 100 may be utilized with some, or all, of the structure and control strategies illustrated in FIG. 1, and may be executed as algorithms in the control module 14. However, the algorithm 100 may also be incorporated into other vehicle and powertrain arrangements, control schemes, or control structures, and has applicability beyond the components schematically illustrated in FIG. 1.

The exact order of the steps of the algorithm 100 shown in FIG. 2 is not required. Steps may be reordered, steps may be omitted, and additional steps may be included. The algorithm 100 is a basic, illustrative method of monitoring vehicle batteries, but may be supplemented with additional features discussed herein.

Algorithm 100 begins at an initiation or start step 110, during which time the algorithm 100 is monitoring operating conditions of the vehicle 10. Initiation may occur in response to the vehicle operator removing the ignition key or in response to the vehicle 10 being turned off and locked. Alternatively, the algorithm 100 may be running constantly or looping regardless of ignition key (or keyless) status, but only advances beyond the step 110 when the vehicle 10 is not operational.

Once the vehicle 10 and the control module 14 are turned off, the algorithm 100 proceeds to step 112 and runs the timer 18 while the vehicle 10 is off. The timer 18 runs for an initial (first) time increment in step 114 and then wakes up the control module 14 at step 116.

After waking the control module 14, the algorithm 100 sets the next (second) time increment at step 118. At step 120, the algorithm 100 samples the state of charge of the battery 12. Step 120 may also include determining whether or not the state of charge needs to be sampled, based upon the initial time increment.

The algorithm 100 determines, from at least the state of charge sampled at step 120, whether or not the battery 12 requires charging at step 122. If the battery 12 does not need to be charged, the algorithm 100 proceeds to step 124 and returns the control module 14 to its off state (sleeping mode). At step 126, the algorithm 100 then returns to the start step 110 with the time increment of step 114 re-set to the next (second) time increment.

If the battery 12 does need to be charged, the algorithm 100 proceeds to step 128 and sends a diagnostic message. The diagnostic message may be sent via the communications path 20. An alert message may be sent to the operator of the vehicle 10 at step 130, such that the operator can make provisions for recharging the battery 12 as soon as possible.

After sending the alert message, the algorithm 100 proceeds to step 132 and returns the control module 14 to its off state (sleeping mode). At step 134, the algorithm 100 then returns to the start step 110 with the time increment of step 114 re-set to the next (second) time increment.

While the best modes and other embodiments for carrying out the claimed invention have been described in detail, those familiar with the art to which this invention relates will recognize various alternative designs and embodiments for practicing the invention within the scope of the appended claims.

The invention claimed is:

1. A method for monitoring a battery of a vehicle having a control module and a timer, comprising:
running the timer while the vehicle is in an off state;
running the timer while the control module is in an off state;
waking up the control module after a first time increment measured by the timer;
setting a second time increment;
sampling a first state of charge of the battery; and
determining with the control module whether the battery requires charging prior to the expiration of the second time increment based upon the first state of charge.

2. The method of claim 1, wherein determining whether the battery requires charging includes comparing the first state of charge to a threshold state of charge.

3. The method of claim 1, further comprising:
waking up the control module based upon the second time increment measured by the timer;
sampling a second state of charge of the battery; and
determining whether the battery requires charging by comparing the second state of charge to the first state of charge.

4. The method of claim 3, further comprising:
setting a third time increment; and
determining whether the battery requires charging prior to the expiration of the third time increment based upon the second state of charge and the first state of charge.

5. The method of claim 4, wherein the vehicle is configured for selective communication with a communications path, and further comprising sending a diagnostic message via the communications path, wherein the diagnostic message includes whether the battery requires charging.

6. The method of claim 5, further comprising, if the battery requires charging, sending an alert message via the communications path to a receiving point, wherein the receiving point is accessible to an operator of the vehicle.

7. The method of claim 6, wherein the diagnostic message further includes the first state of charge.

8. The method of claim 7, wherein the receiving point is one of a telephone number, a cellular telephone number, an email address, and an instant messaging account.

9. The method of claim 8, wherein the communications path includes one of a wireless local area network, a cellular network, a Bluetooth protocol, and satellite communications.

10. The method of claim 9, wherein the vehicle further includes a fuel tank and further comprising:
sampling a fuel level of the fuel tank; and
determining whether the fuel tank requires refueling based upon the fuel level and the determination of whether the battery requires charging.

11. The method of claim 10, wherein the alert message further includes whether the fuel tank requires refueling.

12. A method for monitoring a battery of a vehicle having a control module and a timer, comprising:
running the timer while the vehicle is in an off state;
running the timer while the control module is in an off state;
waking up the control module after a first time increment measured by the timer;
setting a second time increment; and
determining with the control module whether the first time increment requires sampling a first state of charge of the battery, and, if so:
sampling the first state of charge of the battery, and
determining with the control module whether the battery requires charging prior to the expiration of the second time increment based upon the first state of charge of the battery.

13. The method of claim 12, wherein the vehicle is configured for selective communication with a communications path, and further comprising:
sending a diagnostic message via the communications path, wherein the diagnostic message includes whether the battery requires charging; and
if the battery requires charging, sending an alert message via the communications path to a receiving point, wherein the receiving point is accessible to an operator of the vehicle.

14. The method of claim 13, wherein the receiving point is one of a telephone number, a cellular telephone number, an email address, and an instant messaging account.

15. The method of claim 14, wherein the communications path includes one of a wireless local area network, a cellular network, a Bluetooth protocol, and satellite communications.

16. The method of claim 15, further comprising:
if the battery requires charging, sending a remote starting command via the communications path; and
remotely starting the vehicle with the remote starting command, such that the battery is charged without the operator of the vehicle directly accessing the vehicle.

17. The method of claim 16, wherein the remote starting command is sent by the operator from the receiving point.

18. A method for monitoring a battery of a vehicle having a control module and a timer, comprising:
running the timer while the vehicle is in an off state;
running the timer while the control module is in an off state;
waking up the control module after a first time increment measured by the timer;
setting a second time increment with the control module; and
determining with the control module whether the first time increment requires sampling a first state of charge of the battery, and, if so:
sampling the first state of charge of the battery with the control module, and
determining with the control module whether the battery requires charging prior to the expiration of the second time increment based upon the first state of charge of the battery; and returning the control module to the off state, wherein the control module remains in the off state until woken up after the second time increment by the timer.

19. The method of claim 18, wherein the vehicle is configured for selective communication with a communications path outside of the vehicle, and further comprising:

sending a diagnostic message from the control module via the communications path, wherein the diagnostic message includes whether the battery requires charging; and if the battery requires charging, sending an alert message from the control module via the communications path to a receiving point, wherein the receiving point is accessible to an operator of the vehicle, wherein the diagnostic message and the alert message are sent via the communications path before returning the control module to the off state for the second time increment.

* * * * *